(12) United States Patent
Satoh et al.

(10) Patent No.: US 6,718,306 B1
(45) Date of Patent: Apr. 6, 2004

(54) SPEECH COLLATING APPARATUS AND SPEECH COLLATING METHOD

(75) Inventors: Katsuhiko Satoh, Hachioji (JP); Tsuneharu Takeda, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 490 days.

(21) Appl. No.: 09/690,669

(22) Filed: Oct. 17, 2000

(30) Foreign Application Priority Data

Oct. 21, 1999 (JP) .......................................... 11-299745

(51) Int. Cl.[7] .............................................. G10L 17/00
(52) U.S. Cl. ...................... 704/246; 704/243; 704/251; 382/190
(58) Field of Search ................................ 704/243, 251, 704/246; 382/190

(56) References Cited

U.S. PATENT DOCUMENTS

| | | | |
|---|---|---|---|
| 2,938,079 A | * | 5/1960 | Flanagan .................... 704/209 |
| 3,636,261 A | | 1/1972 | Preston, Jr. |
| 4,581,760 A | | 4/1986 | Schiller et al. |
| 4,989,249 A | * | 1/1991 | Oka et al. ..................... 704/251 |
| 5,067,162 A | | 11/1991 | Driscoll, Jr. et al. |
| 5,121,428 A | * | 6/1992 | Uchiyama et al. .......... 704/243 |
| 5,377,302 A | | 12/1994 | Tsiang |
| 5,381,512 A | * | 1/1995 | Holton et al. ............. 704/200.1 |
| 5,548,647 A | * | 8/1996 | Naik et al. ................... 704/200 |
| 5,764,853 A | * | 6/1998 | Watari et al. ............... 704/243 |
| 5,893,058 A | * | 4/1999 | Kosaka ........................ 704/254 |
| 6,088,428 A | * | 7/2000 | Trandal et al. ........... 379/88.02 |
| 6,134,340 A | | 10/2000 | Hsu et al. |
| 6,178,261 B1 | * | 1/2001 | Williams et al. ............ 382/190 |

FOREIGN PATENT DOCUMENTS

| | | |
|---|---|---|
| EP | 0 508 845 A2 | 10/1992 |
| JP | 63-41989 | 2/1988 |
| JP | 09-282458 | 10/1997 |
| JP | 11-250261 | 9/1999 |

OTHER PUBLICATIONS

Furui, "digital speech processing, synthesis, and recognition", ISBN 0–8247–7965–7,1989, p. 291–309.*
Flanagan, "speech analysis synthesis and perception", academic press Inc, 1965, p. 164–166.*
Arai et al. "speech intelligibility in the presence of cross-channel spectral asynchrony", IEEE, ICASSP, 1998, pp. 933–936.*

(List continued on next page.)

*Primary Examiner*—Richemond Dorvil
*Assistant Examiner*—Qi Han
(74) *Attorney, Agent, or Firm*—Frishauf, Holtz, Goodman & Chick, P.C.

(57) ABSTRACT

A speech of a registered speaker input from an input unit is converted by a converting unit to a sound spectrogram "A" and stored. As a speech of a speaker to be identified is input from the input unit and converted to a sound spectrogram "B" by the converting unit, a detecting unit detects a partial image including a plurality of templates placed in the registered speech image A by a placing unit, and each of areas on the unknown speech image B in which maximum correlation coefficients are calculated. Then, a determining unit compares a mutual positional relationship of the plurality of templates with a mutual positional relationship of the respective areas in which the maximum correlation coefficients are detected to determine from the degree of difference therebetween the identity between the registered speech and the unknown speech.

18 Claims, 12 Drawing Sheets

OTHER PUBLICATIONS

Pellom et al. "an efficient scoring algorithm for Gaussian mixture model based speaker identification", IEEE, Signal Processin Letters, vol. 5, No. 11, 1998, pp. 281–284.*

S. Anderson et al: "A Single Chip Sensor & Image Processor for Fingerprint Verification", Proceedings of the IEEE 1991 Custom Integrated Circuits Conference, San Diego, California, May 12–15, 1991.

H. Yahagi et al: "Moving–Window Algorithm for Fast Fingerprint Verification", pp. 343–347, IEEE Proceedings Conference,, vol. 1, 90CH2883–7, Apr. 1–4, 1990, New Orleans, Louisiana.

J. Zhang et al: Face Recognition, Eigenface, Elastic Matching, and Neural Nets:, Proceedings of the IEEE, IEEE, New York, U.S.A., vol. 85, No. 9, Sep. 1, 1997, pp. 1423–1435, XP000738565, ISSN: 0018–9219; *p. 1427, left–hand column, 3rd paragraph—right–hand column, penultimate paragraph*.

* cited by examiner

FIG.4A
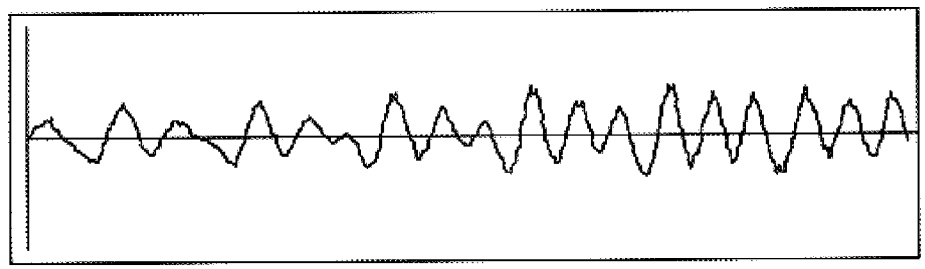
SPEECH SIGNAL DATA WAVEFORM a(n)
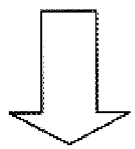
FIG.4B
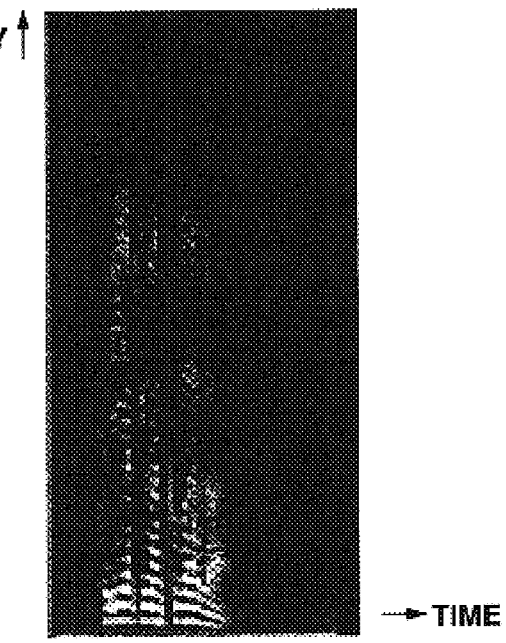
FREQUENCY SPECTRUM TIME
SERIES DESTRIBUTION A(n,f)
(SOUND SPECTROGRAM)

SOUND SPECTROGRAM:A
(REGISTERED DATA)

SOUND SPECTROGRAM:B
(COLLATED DATA)

SOUND SPECTROGRAM:A
(REGISTERED DATA)

SOUND SPECTROGRAM:B
(COLLATED DATA)

SOUND SPECTROGRAM:A
(REGISTERED DATA)

SOUND SPECTROGRAM:B
(COLLATED DATA)

SOUND SPECTROGRAM:A
(REGISTERED DATA)

SOUND SPECTROGRAM:B
(COLLATED DATA)

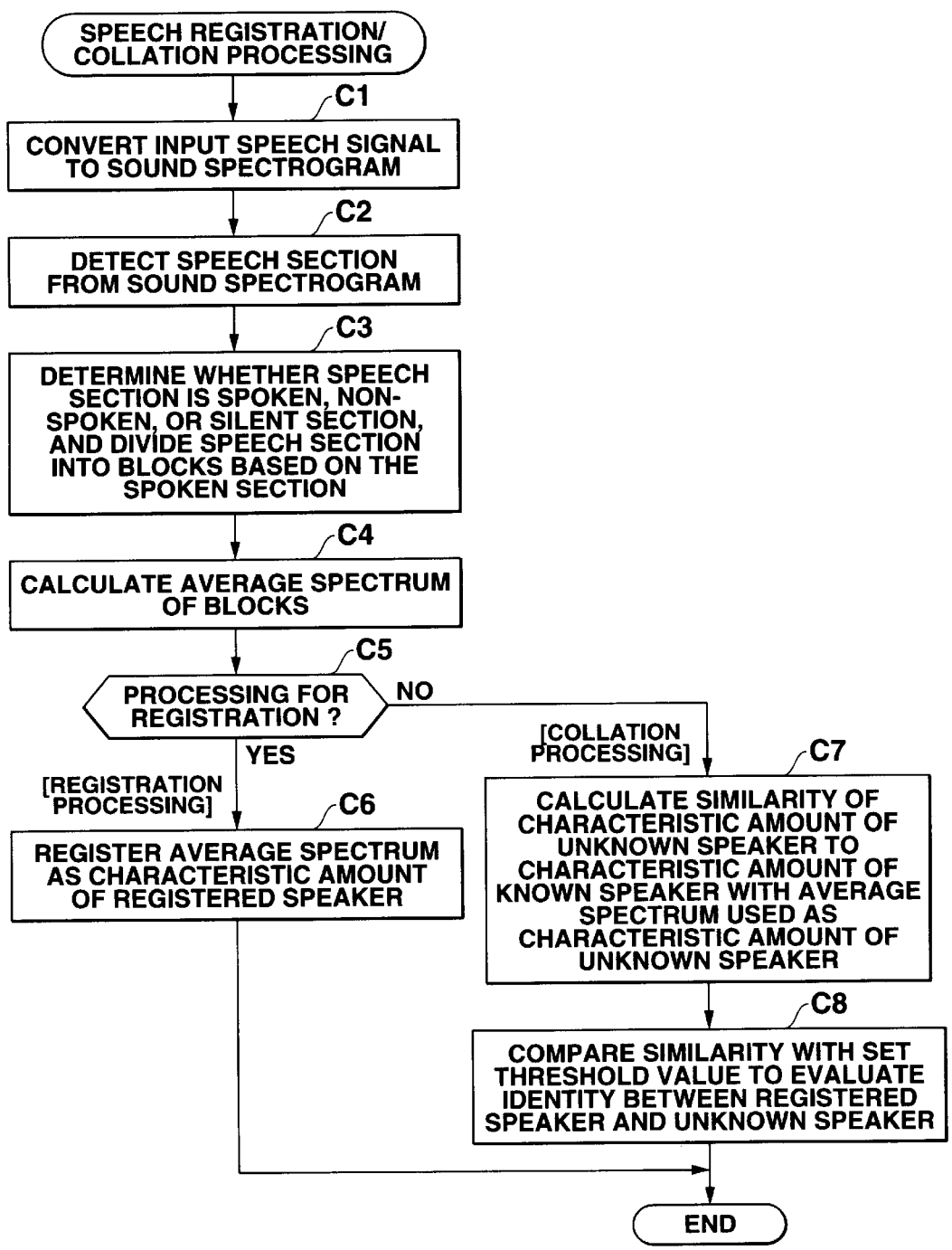

SPEECH COLLATING APPARATUS AND SPEECH COLLATING METHOD

CROSS-REFERENCE TO RELATED APPLICATIONS

This application is based upon and claims the benefit of priority from the prior Japanese Patent Application No. 11-299745, filed Oct. 21, 1999, the entire contents of which are incorporated herein by reference.

BACKGROUND OF THE INVENTION

The present invention relates to a speech collating apparatus and a speech collating method for identifying a person with speech data.

Generally, for identifying a speaker with a speech, a speech signal to be collated is converted to an acoustic parameter such as the frequency spectrum or the like before a collation since it is not efficient to directly compare the speech signal with registered speech signals. Other acoustic parameters available for the purpose may be the principle frequency (pitch frequency), speech energy, format frequency, zero-crossing number, and the like.

Here, since these acoustic parameters include phonetic information primarily and personal information secondarily, a new characteristic amount unique to a speaker must be created from the acoustic parameters for comparison in order to improve the hit rate when the speaker is identified.

A conventional speaker identification is performed in the following manner.

FIG. 14 is a flow chart illustrating a procedure of a speaker identification by means of a conventional speech collating apparatus.

(1) An input speech signal uttered for a word is divided into frames of predetermined unit time, and the frequency spectrum is calculated for each of the frames to derive a time series distribution of the frequency spectra (hereinafter referred to as the "sound spectrogram") (step C1).

(2) A speech section is detected from the sound spectrogram. (step C2).

(3) It is determined whether the speech section is a spoken, a non-spoken, or a silent section to extract the spoken sections from the speech section. Then, the speech section divided into blocks each of which corresponds to each of the spoken sections (step C3).

(4) As a characteristic amount unique to the speaker, an additive average of the sound spectrogram in the time direction (hereinafter referred to as the "average spectrum") is calculated for the blocks (step C4).

(5) It is determined whether the processing is for registration or for collation, and the average spectrum for the blocks is registered as a characteristic amount of a registered speaker when the registration is intended (steps C5→C6).

(6) It is determined whether the processing is for registration or for collation, and the similarity with respect to the characteristic amount of the registered speaker is calculated with the average spectrum of the blocks used as a characteristic amount of an unknown speaker (steps C5→C7).

(7) The similarity of the unknown speaker to the registered speaker is compared with a previously set threshold value to determine the identity of the registered speaker with the unknown speaker (step C8).

As described above, the speaker identification procedure performed by the conventional speech collating apparatus collates a speech signal input by a registered speaker (hereinafter referred to as the "registered speech signal") with a speech signal input by an unknown speaker for collation (hereinafter referred to as the "unknown speech signal") by (1) converting the speech signal to the sound spectrogram; (2) detecting a speech section from the sound spectrogram; (3) extracting a spoken section from the detected speech section based on a determination whether the speech section is a spoken, a non-spoken, or a silent section; and (4) deriving a characteristic amount for each of blocks divided from the extracted spoken section. In this way, the calculation of the characteristic amount applied to the collation processing for actually determining the identity of the registered speech signal with the unknown speech signal involves at least four preprocessing stages, so that a large number of processing steps are required for the overall speaker identification processing.

Also, although the conventional speaker identification procedure which utilizes the additive average of the sound spectrogram in a block in the time direction as a characteristic amount unique to a speaker is advantageous in its relatively simple processing, the creation of a stable characteristic amount requires speech signal data for a relatively long period of time. In addition, since information in the time axis direction is compressed, this procedure is not suitable for text dependent speaker identification. Moreover, since the conventional speaker identification procedure averages personal information superimposed on the phonetic information to the accompaniment of the averaging of the phonetic information, a sufficient characteristic amount is not provided. For this reason, an extra characteristic amount must be added for improving the hit rate, resulting in requiring an extremely large number of preprocessing steps.

Therefore, the improvement of the hit rate implies the problem of an extremely large number of preprocessing steps involved therein.

BRIEF SUMMARY OF THE INVENTION

Accordingly, it is an object of the present invention to provide a speech collating apparatus and a speech collating method which are capable of identifying a speaker at a high hit rate without the need for a large number of preprocessing steps.

According to the present invention, a speech data collating apparatus comprising data converting means for converting two speech signals subjected to a comparison to two two-dimensional data indicative of speech characteristics of the two speech signals; template placing means for placing a plurality of templates for defining a plurality of areas on one of the two-dimensional data; correlated area detecting means for detecting areas on the other of the two-dimensional data and having a maximum correlation with regard to a plurality of areas on the other of the two-dimensional data and corresponding to the plurality of templates; and collation determining means for comparing a mutual positional relationship of the plurality of templates on the one of the two-dimensional data with a mutual positional relationship of the plurality of areas on the other of the two-dimensional data detected by the correlated area detecting means to determine identity between the two speech signals.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIGS. 4A and 4B show how speech signal data is converted to sound spectrogram data in a sound spectrogram converting unit in the speech collating apparatus;

FIG. 14 is a flow chart illustrating a speaker identification procedure performed by a conventional speech collating apparatus.

DETAILED DESCRIPTION OF THE INVENTION

A preferred embodiment of a speech collating apparatus and a speech collating method according to the present invention will now be described with reference to the accompanying drawings.

First Embodiment

Figure 1:
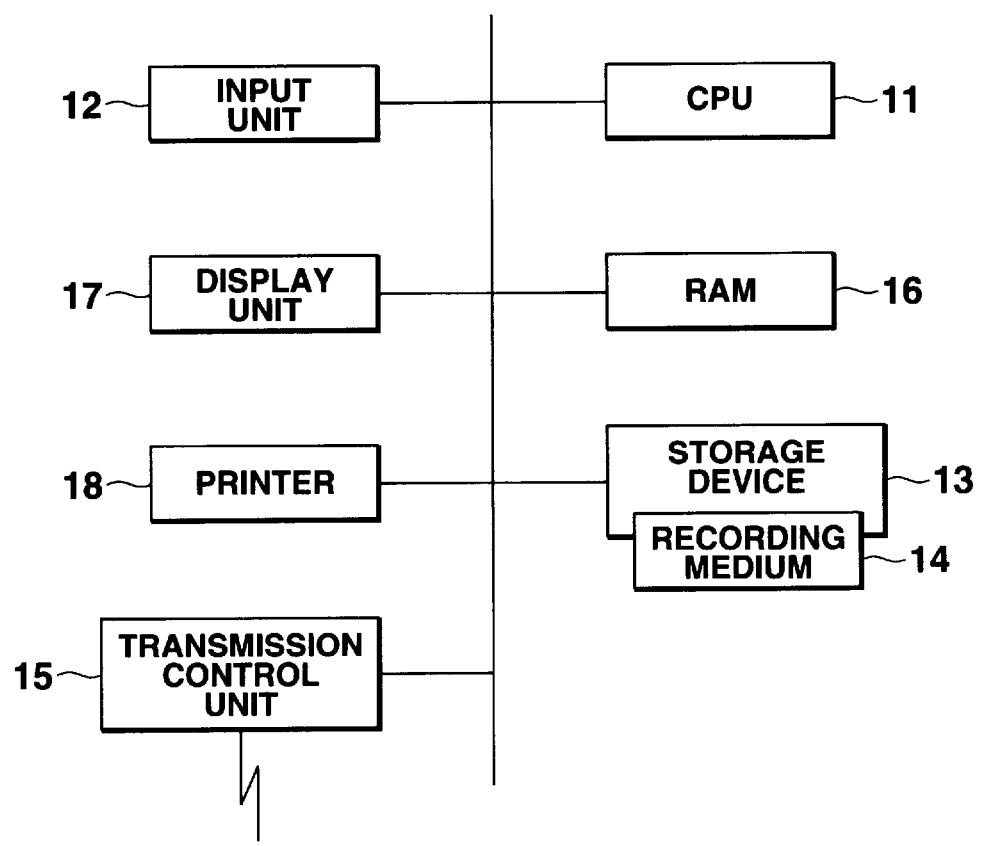
FIG. 1 is a block diagram illustrating the configuration of an electronic circuit in a speech collating apparatus according to a first embodiment of the present invention.

FIG. 1 is a block diagram illustrating the configuration of an electronic circuit in a speech collating apparatus according to the first embodiment of the present invention.

The illustrated speech collating apparatus comprises a computer-based controller (CPU) 11. The CPU 11 is responsive to an input signal from an input unit 12 to initiate a system program previously stored in a storage device 13; a speech registration/collation processing program read into the storage device 13 from an external recording medium 14 such as a floppy disk or the like through a floppy disk drive; or a speech registration/collation processing program downloaded into the storage device 13 from an external computer through a communication network such as an internet and a transmission controller 15, and controls the operation of components of the apparatus with a RAM 16 used as a work memory.

The CPU 11 is connected to a display unit 17 and a printer 18 in addition to the input unit 12, the storage device 13, the transmission controller 15, and the RAM 16.

The input unit 12 comprises a keyboard, a mouse, and a microphone for inputting a speech.

The storage device 13 stores the speech registration/ collation processing program which registers speech data indicative of a speech uttered by a user for a sentence or a word and input into the speech collating apparatus, and collates the registered speech data with newly input speech data indicative of the same sentence or word to determine the identity therebetween, and also stores two-dimensional data, for registration, converted from speech data to be registered which is input in accordance with the speech registration/collation processing.

The RAM 16 temporarily stores two-dimensional data indicative of a sound spectrogram converted from speech data which should be collated with the registered speech data in accordance with the speech registration/collation processing. The sound spectrogram of the registered speech data stored in the storage device 13 is collated with the sound spectrogram of the unknown speech data stored in the RAM 16 for determining the identity therebetween.

In this case, the collation of the sound spectrogram of the registered speech with the sound spectrogram of the unknown speech is performed by placing, for example, rectangular templates at a plurality of positions on the two-dimensional data representing the registered speech, detecting an area at which a maximum correlation coefficient is obtained on the unknown speech two-dimensional data for each of the registered speech two-dimensional data within the plurality of templates, and comparing a distribution of the positions at which the templates are placed on the registered speech two-dimensional data (mutual positional relationship) with a distribution of the positions at which the maximum correlation coefficient is detected on the unknown speech two-dimensional data (mutual positional relationship).

Then, the result of determination on the identity between the registered speech and the unknown speech may be displayed on the display unit 17 or printed by the printer 18.

Figure 2:
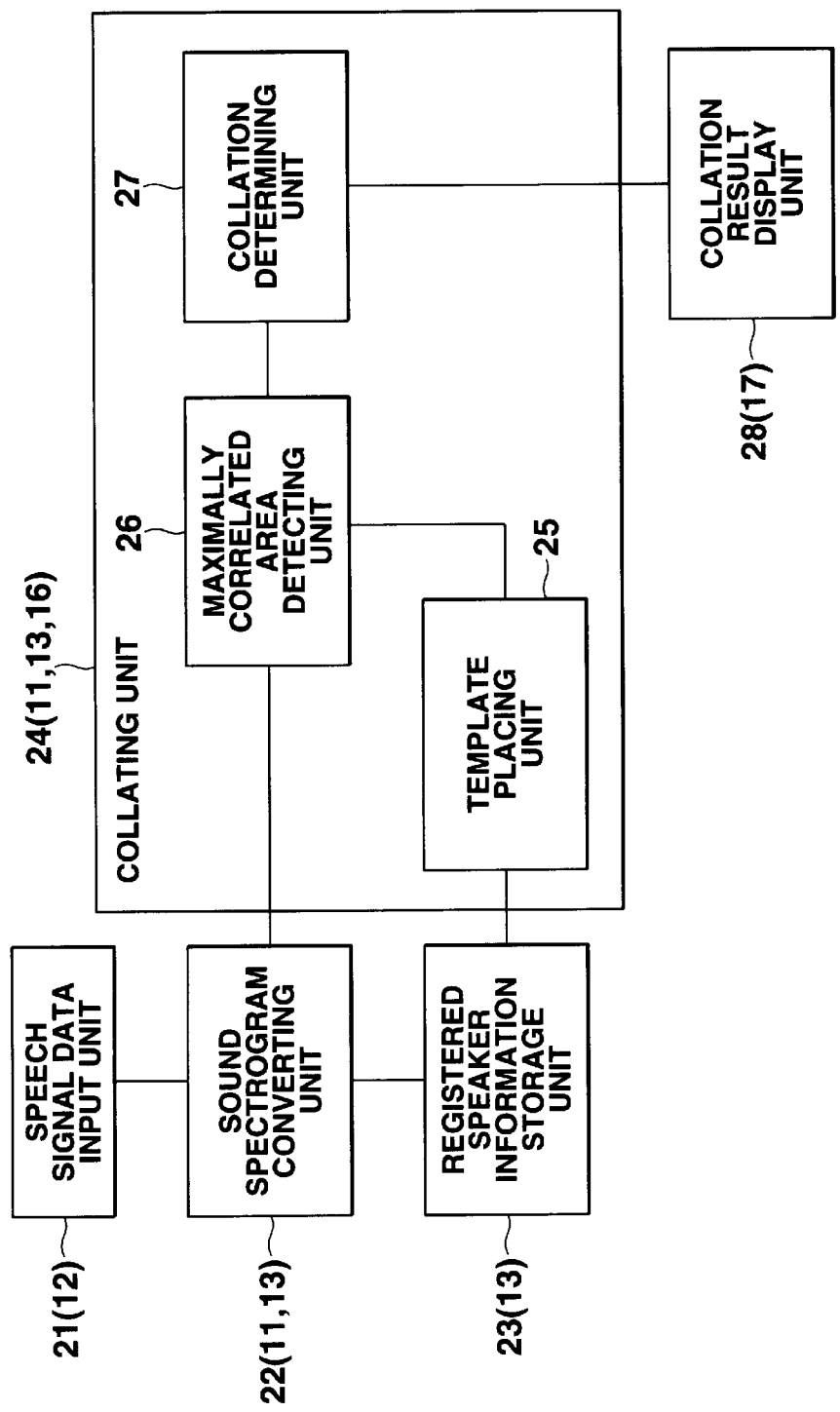
FIG. 2 is a block diagram illustrating the configuration of operational functions in the execution of a speech registration/collation processing program in the first embodiment of the speech collating apparatus.

FIG. 2 is a block diagram illustrating the configuration of operational functions according to the execution of the speech registration/collation processing program in the first embodiment of the speech collating apparatus.

In the functional blocks indicative of operational functions in the speech collating apparatus, corresponding components in the electronic circuit in FIG. 1 are additionally designated reference numerals in parenthesis.

A speech signal data input unit 21 employs a microphone or the like to convert a speech to be registered or a speech to be collated into an electric signal and inputs the resulting electric signal to a subsequent unit. Speech signal data indicative of a registered speech or an unknown speech input through the speech signal data input unit 21 is supplied to a sound spectrogram converting unit 22.

The sound spectrogram converting unit 22 converts speech signal data indicative of a registered speech or an unknown speech input from the speech signal data input unit 21 to two-dimensional data (sound spectrogram) which represents a time-series distribution of the frequency spectrum in the form of density, such that a more frequency component appears brighter and a less frequency component appears darker on a coordinate system which indicates the frequency on the vertical axis and the time on the horizontal axis (see FIGS. 4A and 4B). The sound spectrogram of the registered speech or the unknown speech converted by the sound spectrogram converting unit 22 is supplied to a registered speaker information storage unit 23 for the registered speech, and to a maximally correlated area detecting unit 26 of a collating unit 24 for the unknown speech.

The registered speaker information storage unit 23 registers data indicative of registered speeches in the form of sound spectra converted by the sound spectrogram converting unit 22.

A template placing unit 25 of the collating unit 24 defines a plurality of rectangular areas (templates) of an arbitrary size, and places the templates at arbitrary positions on a sound spectrogram of a registered speech stored in the registered speaker information storage unit 23 (see FIG. 5). Two-dimensional data within the areas respectively corresponding to the plurality of templates placed by the template placing unit 25 is supplied to the maximally correlated area detecting unit 26.

The maximally correlated area detecting unit 26 detects a plurality of areas (maximally correlated areas) having maximum correlations on an unknown speech sound spectrogram supplied from the sound spectrogram converting unit 22 for the two-dimensional data within the areas respectively corresponding to the plurality of templates on the registered sound spectrogram supplied from the template placing unit 25 (see FIG. 6). Coordinate data indicative of the respective positions of the plurality of templates placed on the registered speech sound spectrogram by the template placing unit 25, and coordinate data indicative of the respective positions of a plurality of maximally correlated areas detected by the maximally correlated area detecting unit 26 are supplied to a collation determining unit 27.

The collation determining unit 27 relies on the coordinate data indicative of the respective positions of the plurality of templates on the registered speech sound spectrogram supplied from the template placing unit 25 and the coordinate data indicative of the respective positions of the plurality of maximally correlated areas detected by the maximally correlated area detecting unit 26 to compare a distribution of the positions at which the templates are placed on the registered speech sound spectrogram (mutual positional relationship) with a distribution of the positions at which the maximally correlated areas are detected on the unknown speech sound spectrogram (mutual positional relationship) to determine the similarity of the registered speech to the unknown speech from a difference therebetween for evaluating the identity. The result of the evaluation for the identity between the registered speech and the unknown speech, produced by the collation determining unit 27, is supplied to and displayed on a collation result display unit 28.

Next, the speech collating apparatus will be described particularly in terms of the operation with the configuration described above.

Figure 3:
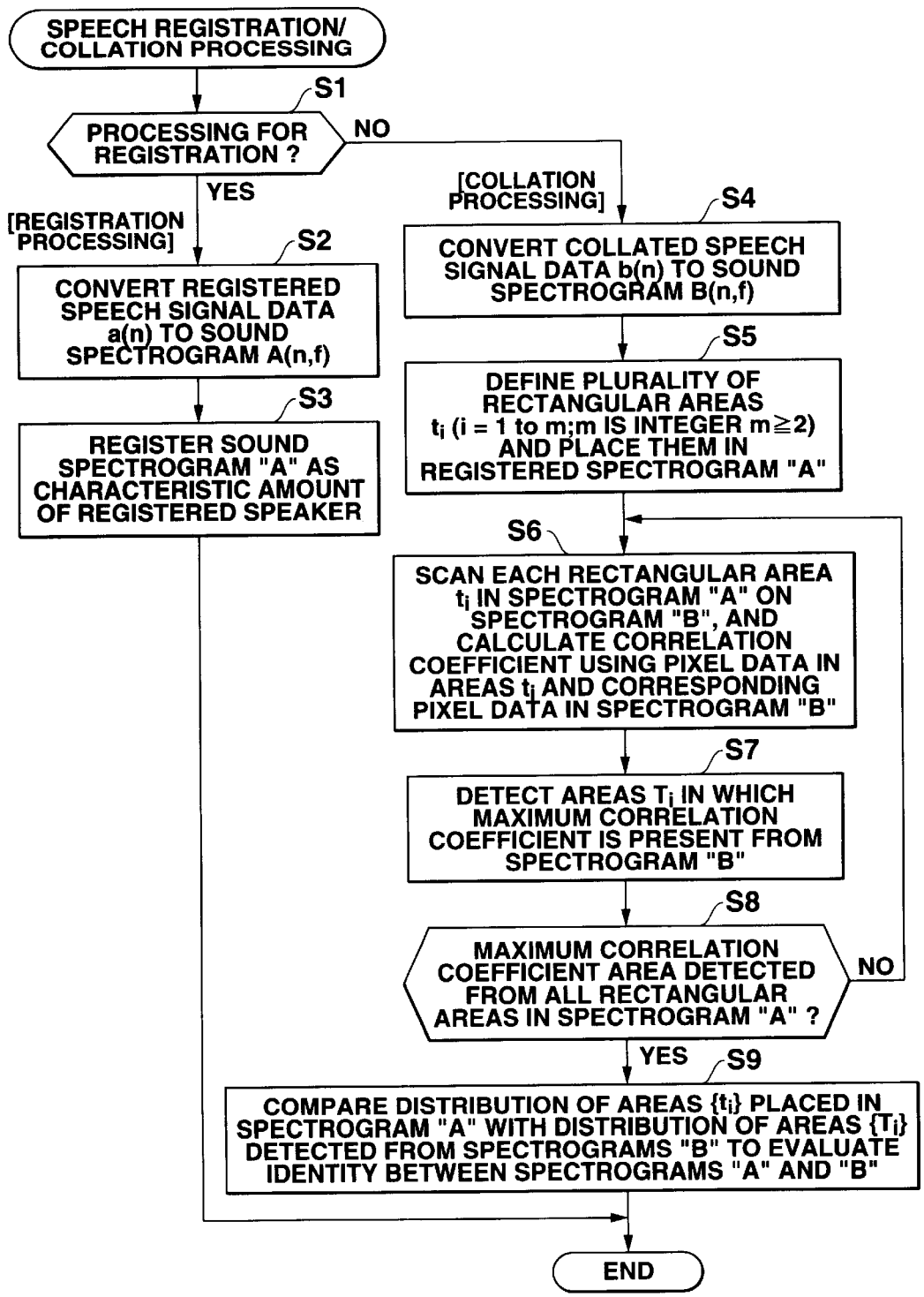
FIG. 3 is a flow chart illustrating the speech registration/ collation processing in the first embodiment of the speech collating apparatus.

FIG. 3 is a flow chart illustrating speech registration/ collation processing in the first embodiment of the speech collating apparatus.

FIGS. 4A and 4B show how speech signal data is converted to sound spectrogram data in the sound spectrogram converting unit 22 in the speech collating apparatus.

Figure 5A:
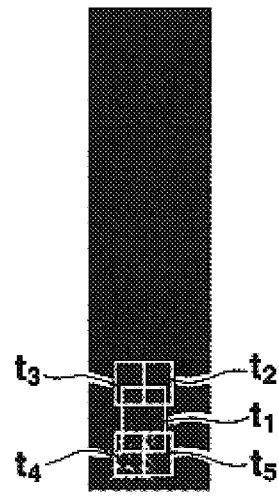
FIGS. 5A and 5B show a comparison of a registered speech spectrogram with an unknown speech spectrogram, and a placement of a template on the registered speech spectrogram, according to the speech registration/collation processing in the speech collating apparatus.
Figure 5B:
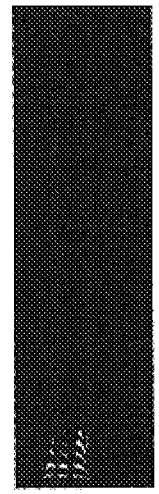

FIGS. 5A and 5B show a comparison of a registered speech spectrogram with an unknown speech spectrogram (to be collated data), and a placement of templates on the registered speech spectrogram according to the speech registration/collation processing in the speech collating apparatus.

Figure 6A:
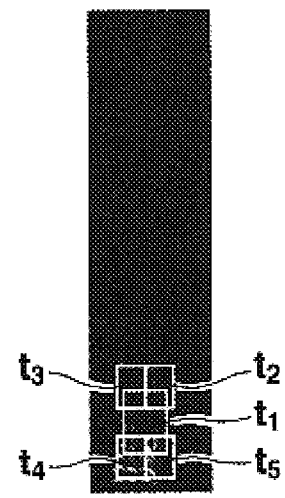
FIGS. 6A and 6B show a comparison of a distribution of positions at which template areas are placed on a registered speech spectrogram with a distribution of positions at which maximally correlated areas are detected on an unknown speech spectrogram, according to the speech registration/ collation processing in the speech collating apparatus.
Figure 6B:
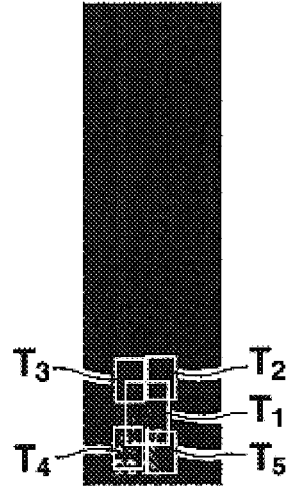

FIGS. 6A and 6B show a comparison of a distribution of positions at which template areas are placed on a registered speech spectrogram with a distribution of positions at which maximally correlated areas are detected on an unknown speech spectrogram (to be collated data), according to the speech registration/collation processing in the speech collating apparatus.

For utilizing the speech collating apparatus as a person identifying apparatus, speech signal data of a registered person subjected to the identification is first input from the speech signal data input unit 21. This input registered speech signal data a(n) is converted to time series data A(n, f) of frequency spectrum (hereinafter referred to as the sound spectrogram "A") in the sound spectrogram converting unit 22 as shown in FIGS. 4A and 4B (steps S1 and S2).

The conversion processing performed in the sound spectrogram converting unit 22 for converting the speech signal data to the sound spectrogram involves dividing speech signal data d(n) into frames at intervals of predetermined unit time (the number of sampling points is N), multiplying the divided data series $d_N(n)$ by an Humming window function $w_N(n)$ as a window function, Fast Fourier Transforming (FFT) the result of multiplication to calculate frequency spectra S(f), arranging the frequency spectra S(f) calculated for the respective divided frames in a time series, and converting the frequency spectra S(f) to a sound spectrogram S(n, f) in which the horizontal axis represents the time and the vertical axis represents the frequency. It should be noted that a spectrum value is derived by taking a logarithm of an original value and normalizing the logarithmic value by a maximum value of 255. In other words, this sound spectrogram has an aspect of a multi-level gradation two-dimensional data, i.e., multi-level gradation image data, so that this embodiment applies the sound spectrogram to the speaker identification as a multi-level gradation voice print image.

In the following, the sound spectrogram is regarded as multi-level gradation image data in which each word corresponds to pixel data.

The sound spectrogram "A" corresponding to a speech of a registered speaker obtained by the sound spectrogram converting unit 22 is stored in the registered speaker information storage unit 23 and registered as a characteristic amount of the registered speaker (step S3).

On the other hand, as speech signal data of an unknown speaker subjected to the identification in the person identifying apparatus is input through the speech signal data input unit 21, the input unknown speech signal data b(n) is converted to a sound spectrogram B(n, f) (hereinafter referred to as the spectrogram "B") in the sound spectrogram converting unit 22 in a manner similar to the speech data of the registered speaker (steps S1 to S4).

Subsequently, in the template placing unit 25 in the collating unit 24, the sound spectrogram "A" of the registered speech registered in the registered speaker information storage unit 22 is read. Then, as shown in FIG. 5A, a plurality of rectangular areas, i.e., templates $t_i$ (i=1 to m, where m is an integer equal to or more than two) are defined and placed in the sound spectrogram "A" (step S5).

Subsequently, the maximally correlated area detecting unit 26 in the collating unit 24 raster-scans a rectangular area corresponding to each of the template $t_i$ defined in the sound spectrogram "A" of the registered speech on a pixel-by-pixel basis in the horizontal direction and in the vertical direction on the sound spectrogram "B" of the unknown speech to sequentially calculate a correlation coefficient using all pixel data in the associated template $t_i$ and pixel data in the sound spectrogram "B" of the unknown speech in the rectangular area. Thus, an area $T_i$ in the sound spectrogram "B" of the unknown speech in which a maximum correlation coefficient is present is detected as shown in FIG. 6B (step S6 and S7). How to calculate the correlation coefficient will be described later.

The calculation of the maximum correlation coefficient on the sound spectrogram "B" of the unknown speech, based on the image data of each template $t_i$ defined in the sound spectrogram "A" of the registered speech, and the detection of the area $T_i$ are sequentially performed for each template $t_i$ (steps S6 to S8). Then, upon determining that the respective areas $T_i$ on the sound spectrogram "B" of the unknown speech have been detected for all the templates $t_i$ as having the maximum correlation coefficients, the collation determining unit 27 in the collating unit 24, as shown in FIGS. 6A and 6B, compares a distribution of the respective template areas $\{t_i\}$ placed in the sound spectrogram "A" of the registered speech (positional relationship) with a distribution of the respective areas $\{T_i\}$ detected from the sound spectrogram "B" of the unknown speech (positional relationship) based on their respective coordinate data to evaluate the identity therebetween (step S8 and S9).

In the following, a specific example will be described.

The coordinates which serve as the basis for specifying positions of a template $t_1$ placed in the sound spectrogram "A" of the registered speech and of a rectangular area $T_1$ on the image detected from the sound spectrogram "B" of the unknown speech, for example, the coordinates of the upper left corners of the two rectangles are acquired, and stored in predetermined locations of the RAM 16 as $t_1(X_1, Y_1)$ and $T_1(XT_1, YT_1)$, respectively.

Next, templates $t_2$ to $t_5$ are defined in the sound spectrogram "A" of the registered speech such that these templates are centered at the respective corners of the template $t_1$. It should be noted herein that the placement of the defined templates is arbitrary, and the number of the templates is not limited to four but may be any arbitrary number as long as a required collation accuracy can be ensured for the speech collation. Also, the size of the templates defined herein may be arbitrary as well.

Then, similar to the detection of the rectangular area $T_1$, in each of the templates $t_2$ to $t_5$ (hereinafter represented by $t_i$ (i=2, 3, 4, 5)), a rectangular area having the same size as the template $t_i$ is set on the sound spectrogram "B" of the unknown speech. The rectangular area is two-dimensionally moved in units of pixels, and a correlation coefficient between the rectangular area and the template $t_i$ is calculated each time the rectangular area is moved. Finally, a rectangular area at a position at which a maximum correlation coefficient is present is designated as a rectangular area $T_i$, and the coordinates which serve as the basis for specifying the positions of the template $t_i$ and the rectangular area $T_i$ on the image, for example, the coordinates of the upper left corners of the two rectangles are acquired, and stored in predetermined locations of the RAM 16 as $t_i(X_i, Y_i)$, $T_i(XT_i, YT_i)$, respectively.

Subsequently, a difference $\Delta i$ between the relative distance from $t_1$ to $t_i$ and the relative distance from $T_1$ to $T_i$ is calculated based on the following equation for all possible values of i (=2, 3, 4, 5):

$$\Delta i = |(Xi-X1)-(XTi-XT1), (Yi-Y1)-(YTi-YT1)|$$

Then, it is determined whether or not all of the calculated values $\Delta_i$ lies within a predetermined range. If all the values lies within the predetermined range, it can be determined that the registered speech matches the unknown speech, and otherwise the unknown speech is determined to unmatch the registered speech, followed by the determination result displayed on the collation result display unit 28. It should be noted that the predetermined range used herein is defined to be a range in which a desired collation accuracy is ensured based on a distribution of the result of actually calculated $\Delta_i$ from image data of sound spectrograms acquired from a plurality of persons.

In this way, the evaluation is made as to whether or not the unknown person who has input the unknown speech signal data b(n) has the identity to the registered speaker who had registered the registered speech signal data a(n), and the evaluation result is displayed or printed.

In the foregoing speech registration/collation processing, the templates are placed on the sound spectrogram "A" of the registered speech. Alternatively, the templates may be placed on the sound spectrogram "B" of the unknown speech to find the maximally correlated areas $T_i$ on the sound spectrogram "A". Also, while the respective areas $t_1$, $T_1$, $t_2$ to $t_5$, and $T_2$ to $T_5$ are defined to be rectangular, these areas are not limited to rectangular but may be in an arbitrary shape. Also, while $t_1$ and $T_1$, and $t_2$ to $t_5$, and $T_2$ to $T_5$ are preferably of the same size and shape, a slight difference is allowable as long as a required collation accuracy can be ensured for the speech collation.

Further, a variety of methods may be employed for the collation determination other than the method of evaluating $\Delta_i$ in the foregoing processing. For example, the determination may be made based on a difference in shape or area between a figure formed with $t_i$ defined as an apex and a figure formed with $T_i$ defined as an apex.

Next, description will be made on the calculation of a correlation coefficient used in the speech registration/collation processing. Specifically, described herein is the calculation of a correlation coefficient between a rectangular area "A" and a rectangular area "B".

First, assume that pixels included in the rectangular area "A" and the rectangular area "B" are A(i, j) and B(m, n), respectively. It should be noted that a total number of pixels included in the rectangular area "A" and the rectangular area "B" are equal. Assume also that signal intensities represented by multi-level gradation values indicative of the contrast of these pixels are $X_{ij}$ and $Y_{mn}$ respectively.

The following equation is defined when these signal intensities are generalized and represented by $z_{pq}$:

$$<z> = N^{-1} \Sigma Z_{pq}$$

In the above equation, N indicates the total number of pixels included in an associated rectangular area. Also, in the above equation, Σ indicates the total sum of all pixels included in the associated rectangular area. In other words, the above equation indicates an average value of the signal intensities for the pixels included in the associated rectangular area.

Next, the following equation is also defined:

$$<z^2> = N^{-1} \Sigma Z_{pq}^2$$

The above equation indicates a root mean square value of the signal intensities for the pixels included in the associated rectangular area.

Here, a correlation coefficient $C_{AB}$ between the rectangular area "A" and the rectangular area "B" can be calculated by the following equation which is expressed using the definitions of the foregoing equations:

$$C_{AB} = \frac{<XY> - <X><Y>}{\sqrt{(<X^2> - <X>^2)(<Y^2> - <Y>^2)}}$$

where $<XY> = (1/N) \Sigma X_{ij} Y_{mn}$.

The correlation coefficient between the areas is calculated using the above equation.

In the calculation of the correlation coefficient by the foregoing equation, instead of using signal intensities of all pixels in the rectangular areas, the calculation may be made using only those pixels which are located in an arbitrary line within each of the rectangular areas; only those pixels which are included in a portion of each of the rectangular areas; or only those pixels selected as a result of arbitrarily sampled pixels from each of the rectangular areas, as long as a required collation accuracy can be ensured for the speech collation. The use of such a calculation approach is advantageous in a reduction in the number of pixels subjected to the calculation of the correlation coefficient and a resulting reduction in the amount of calculations. Further alternatively, other correlation coefficient calculating method may be employed in the speech registration/collation processing.

As appreciated from the foregoing, according to the speech collating apparatus of the first embodiment configured as described above, the processing for converting speech signal data to a sound spectrogram is only required as the preprocessing for calculating a characteristic amount applied to the collation processing for actually determining the identity between registered speech signal data and unknown speech signal data, so that the number of processing steps can be significantly reduced. In addition, since the sound spectrogram converted from the speech signal data is managed as multi-level gradation two-dimensional data, i.e., pixel data, and a contrast pattern of the sound spectrogram itself is used as the characteristic amount for use in the collation, the collation can be accomplished using a characteristic amount from which personal information is not lost. It is therefore possible to realize a speaker identifying apparatus which maintains a sufficiently high hit rate while reducing the number of processing steps to simplify the overall collation processing.

In the speech collating apparatus of the first embodiment, overall multi-level gradation image data of sound spectrogram has been stored in the registered speaker information storage unit 23 for registration as a characteristic amount of a registered speaker. For collating unknown speech signal data input by an unknown speaker, the template placing unit 25 places templates in the sound spectrogram read from the registered speaker information storage unit 23 for collation with multi-level gradation image data of sound spectrogram of an unknown speech. Alternatively, as described in the following speech collating apparatus according to a second embodiment, the templates may be previously placed on the multi-level gradation image data of sound spectrogram of a registered speech, and image data only corresponding to the areas of the templates is stored in the registered speaker information storage unit 23 as a characteristic amount of the registered speaker to reduce the amount of information per registered speaker which should be stored in the registered speaker information storage unit 23.

Second Embodiment

Figure 7:
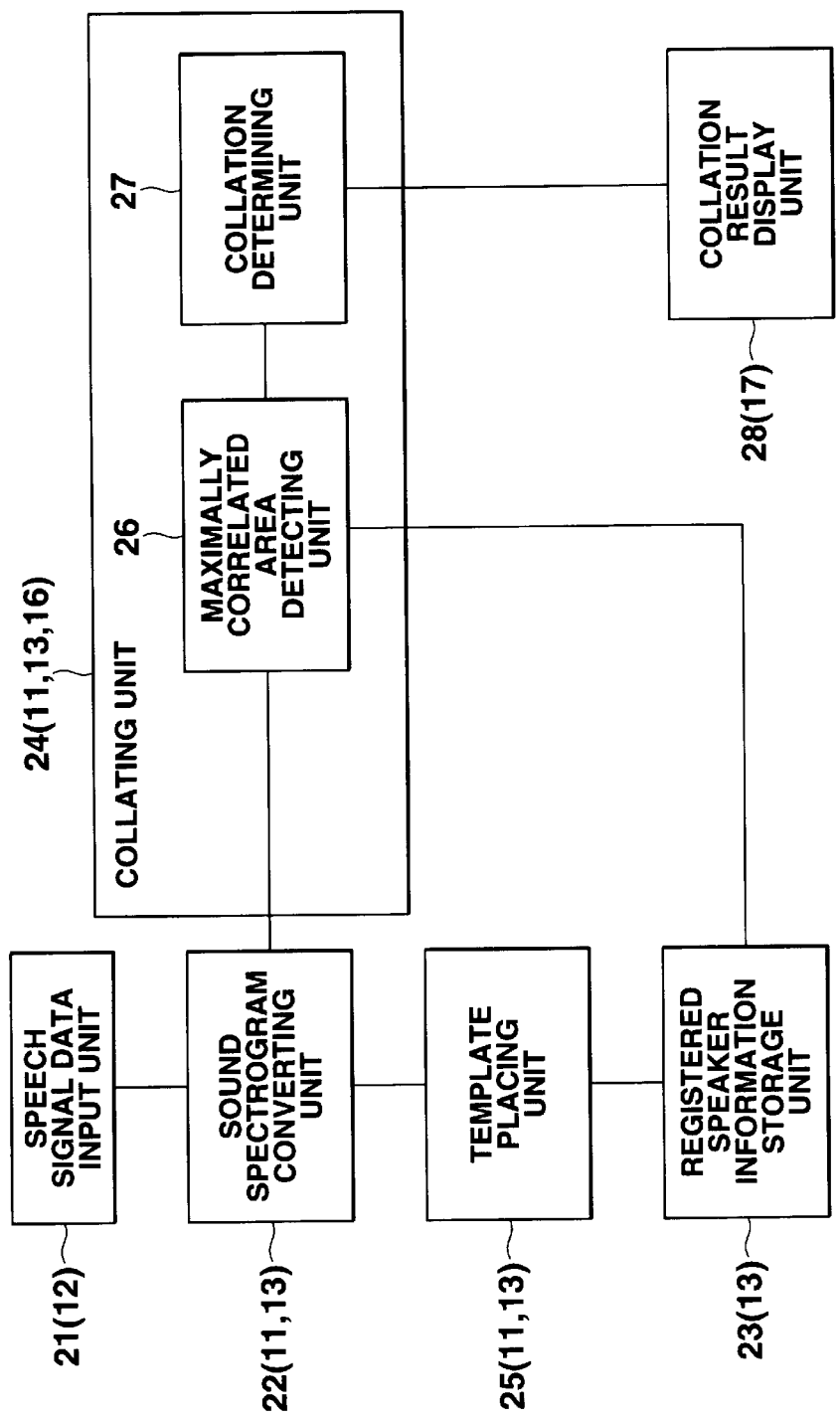
FIG. 7 is a block diagram illustrating the configuration of operational functions in the execution of a speech registration/collation processing program according to a second embodiment of the speech collating apparatus of the present invention.

FIG. 7 is a block diagram illustrating the configuration of operational functions in the execution of a speech registration/collation processing program according to the second embodiment of the speech collating apparatus of the present invention.

Figure 8:
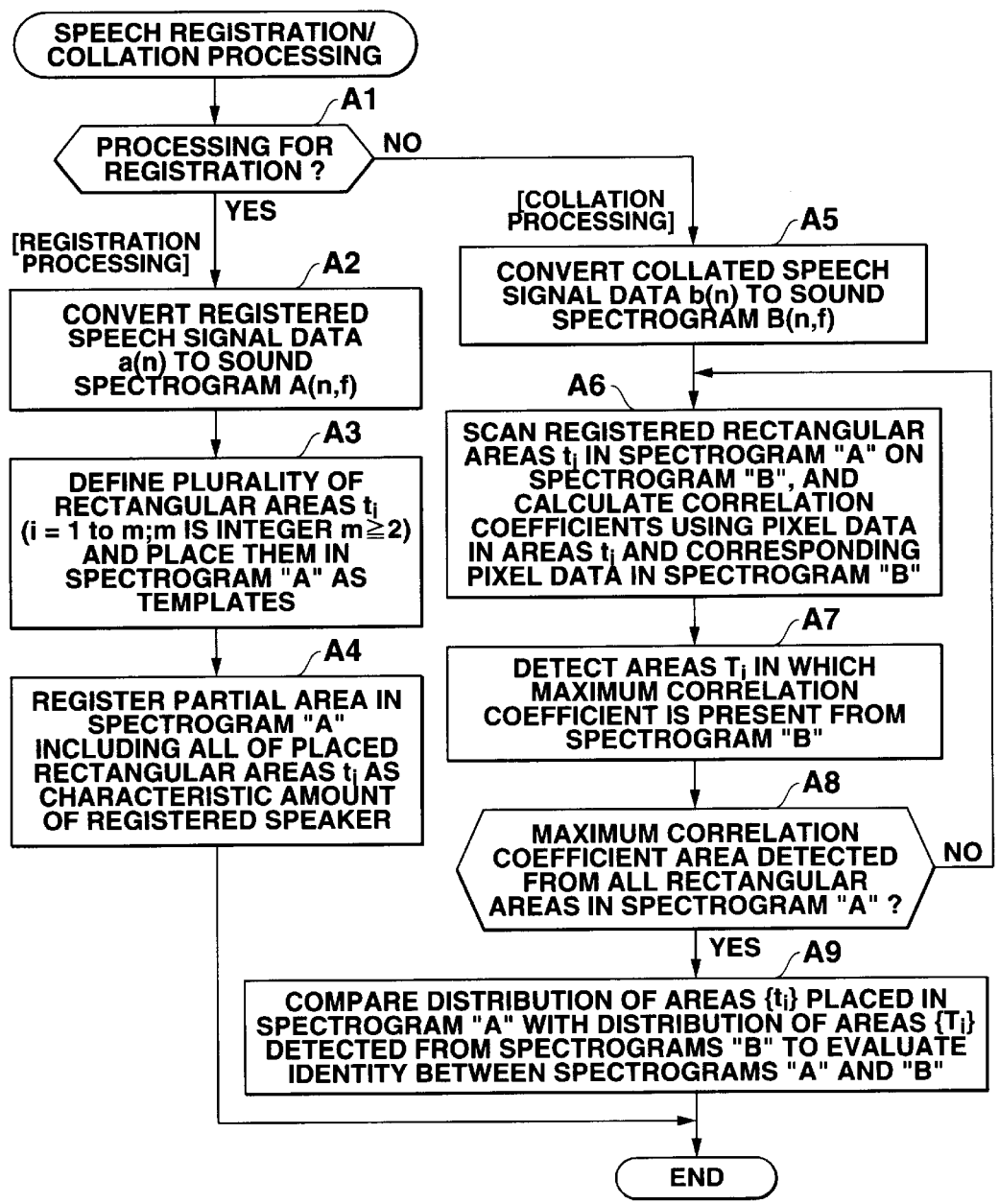
FIG. 8 is a flow chart illustrating the speech registration/ collation processing in the second embodiment of the speech collating apparatus.

FIG. 8 is a flow chart illustrating the speech registration/collation processing in the second embodiment of the speech collating apparatus.

Specifically, for registering a characteristic amount of a registered speaker, the template placing unit 25 previously places templates $t_i$ on a sound spectrogram "A" of the registered speaker (step A3), which has been converted by the sound spectrogram converting unit 22 (steps A1 and A2), and each of areas in the sound spectrogram "A" surrounded by each of all templates $t_i$ placed thereon is registered in the registered speaker information storage unit 23 as a characteristic amount of the registered speaker (step A4).

For collating speech data of a speaker to be identified, the maximally correlated area detecting unit 26 in the collating unit 24 reads the portions in the sound spectrogram "A" of the registered speaker corresponding to the respective templates $t_i$, registered in the registered speaker information storage unit 23. Then, similar to the first embodiment, the collation is performed by detecting the respective maximum correlation coefficient areas $T_i$ on a sound spectrogram of an unknown speech (steps A1 and A5 to A8), and comparing a positional relationship of the respective templates $t_i$ with a positional relationship of the respective detected areas $T_i$ for determining a difference therebetween (step A9).

As appreciated, according to the speech collating apparatus of the second embodiment configured as described above, it is possible to reduce the amount of information per registered speaker to be stored in the registered speaker information storage unit 23 and accordingly to reduce the entire storage capacity of the registered speaker information storage unit 23 itself. In other words, the speech collating apparatus of the second embodiment can be implemented with a smaller capacity of memory than the speech collating apparatus of the first embodiment.

In the speech collating apparatus according to the first and second embodiments, a plurality of templates $t_i$ are placed at arbitrary positions in the entire sound spectrogram "A" of a registered speaker. Alternatively, as described in the following speech collating apparatus of a third embodiment, the speech collating apparatus may be configured to detect a speech section which sufficiently includes speech characteristics of a registered speaker from the sound spectrogram "A" of a registered speech through a previously set threshold value, and to place templates $t_i$ at arbitrary positions in the spectrogram "A" included in the detected speech section to collate an unknown speech based on more characteristic speech data of the registered speaker, thereby further improving the hit rate.

Third Embodiment

Figure 9:
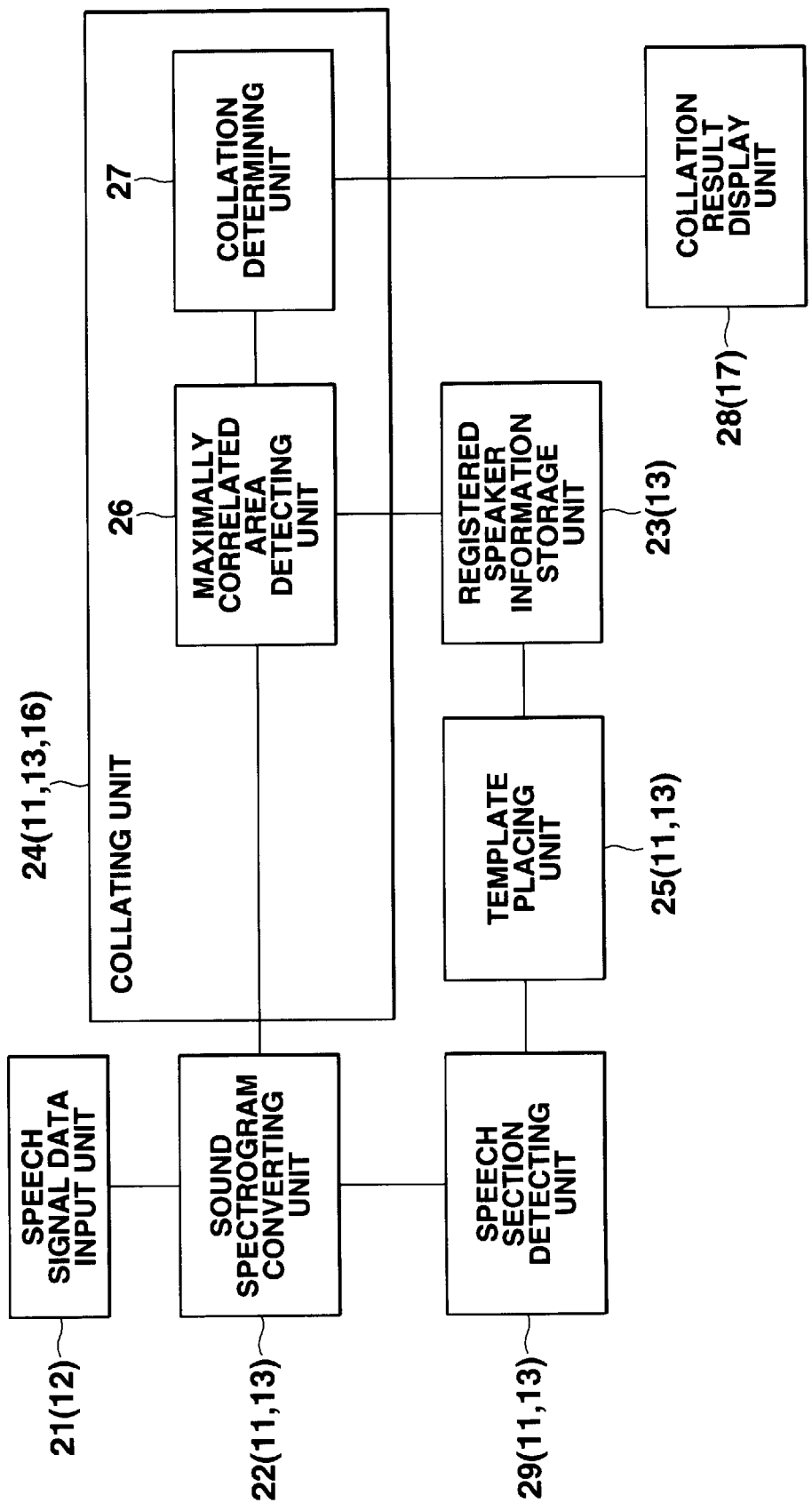
FIG. 9 is a block diagram illustrating the configuration of operational functions in the execution of a speech registration/collation processing program according to a third embodiment of the speech collating apparatus of the present invention.

FIG. 9 is a block diagram illustrating the configuration of operational functions in the execution of a speech registration/collation processing program according to a third embodiment of the speech collating apparatus of the present invention.

The operational function blocks of the speech collating apparatus in the third embodiment additionally include a speech section detecting unit 29 provided between the sound spectrogram converting unit 22 and the template placing unit 25.

Figure 11:
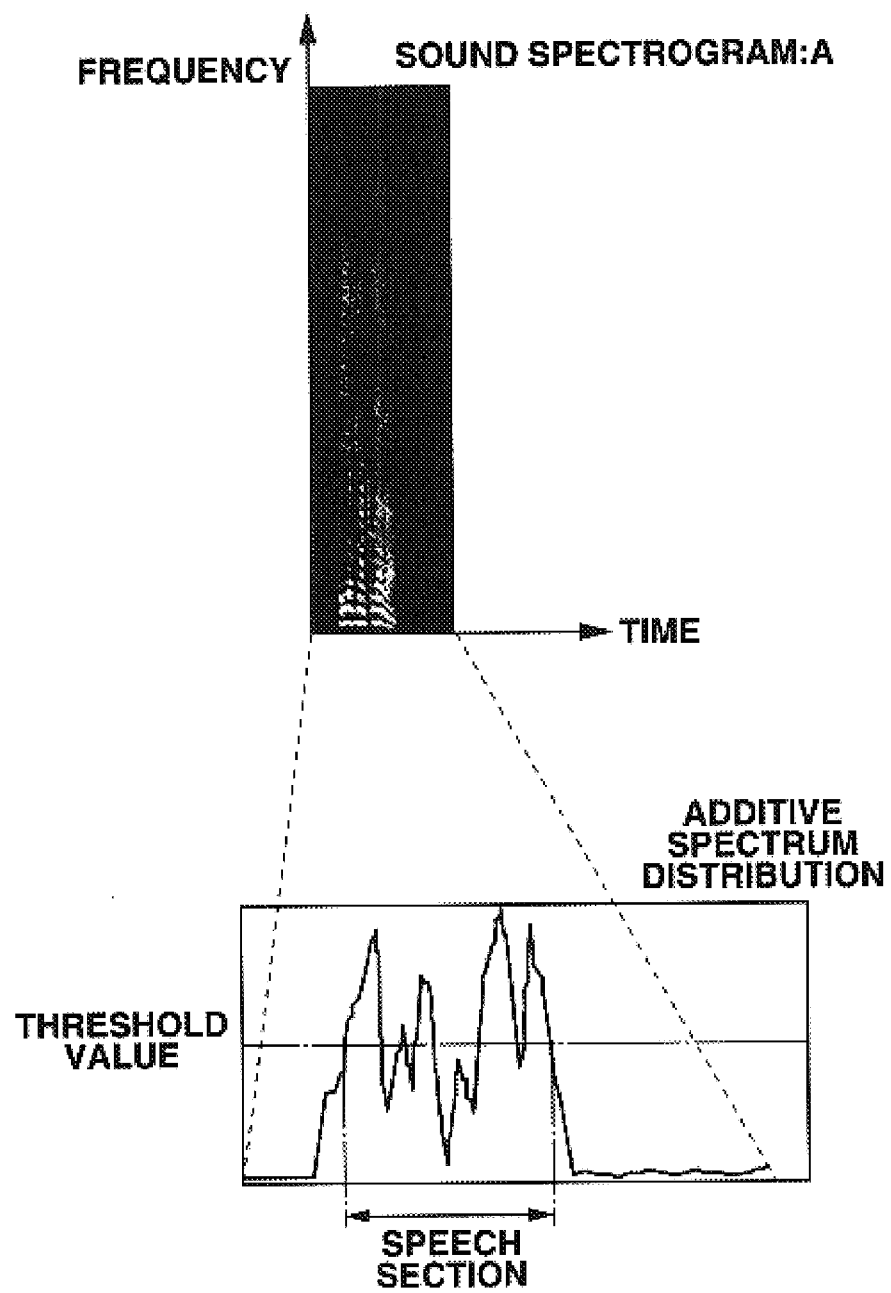
FIG. 11 shows how a speech section is detected from a sound spectrogram "A" of a registered speech in a speech section detecting unit in the speech collating apparatus of the third embodiment.

The speech section detecting unit 29 detects a speech section which sufficiently includes speech characteristics of a registered speaker from a sound spectrogram "A" of a registered speech converted by the sound spectrogram converting unit 22 (see FIG. 11). In the speech section on the sound spectrogram "A" detected by the speech section detecting unit 29, the template placing unit 25 places a plurality of templates $t_i$ which serve as the basis for the speech collation.

Figure 10:
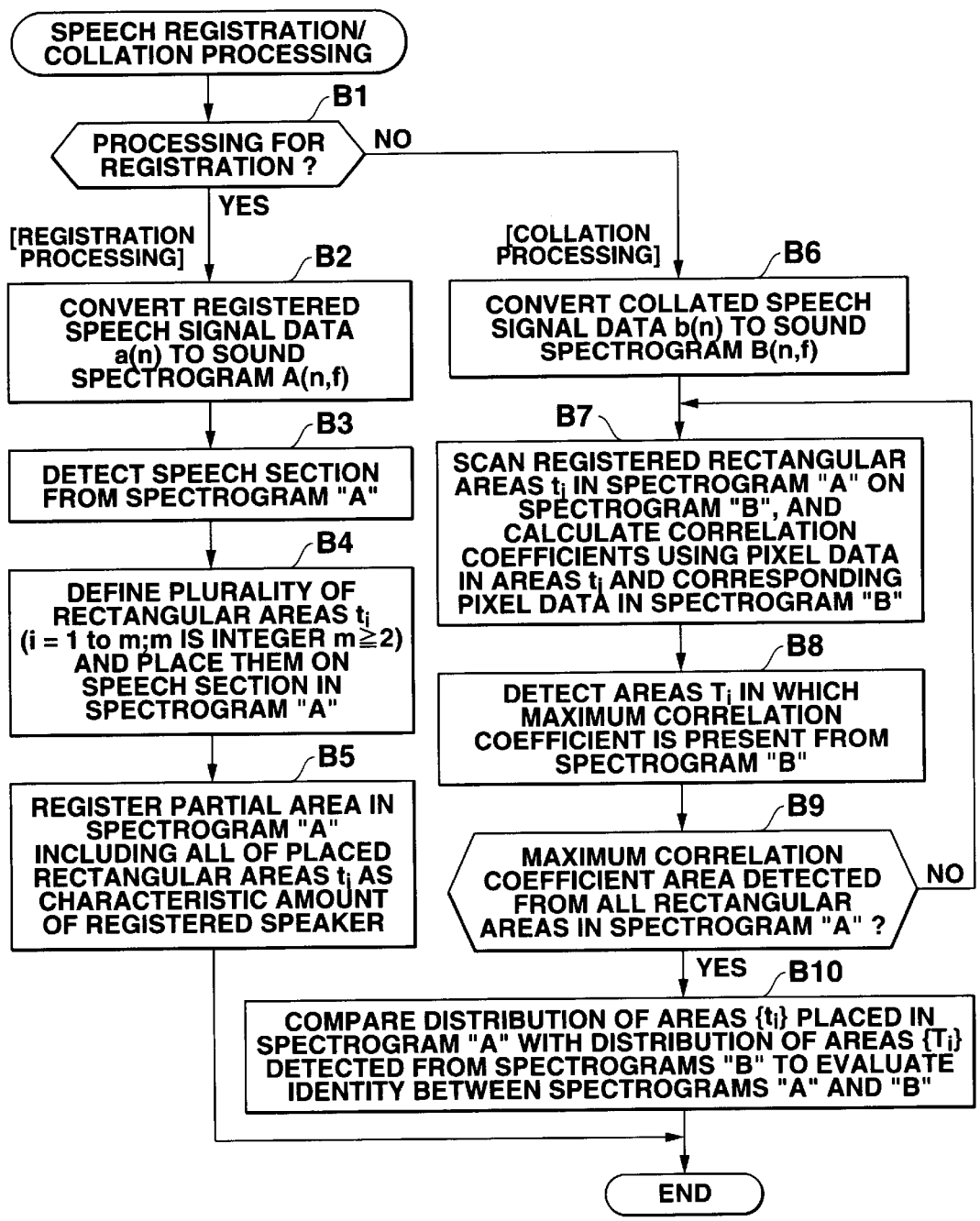
FIG. 10 is a flow chart illustrating the speech registration/ collation processing in the third embodiment of the speech collating apparatus.

FIG. 10 is a flow chart illustrating speech registration/collation processing in the third embodiment of the speech collating apparatus.

FIG. 11 shows how a speech section is detected from the sound spectrogram "A" of the registered speech in the speech section detecting unit 29 in the speech collating apparatus of the third embodiment.

Figure 12A:
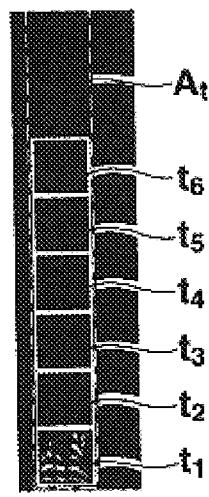
FIGS. 12A and 12B show a comparison of a registered speech spectrogram with an unknown speech spectrogram, and a placement of a template on the registered speech spectrogram, in the speech registration/collation processing in the speech collating apparatus of the third embodiment.
Figure 12B:
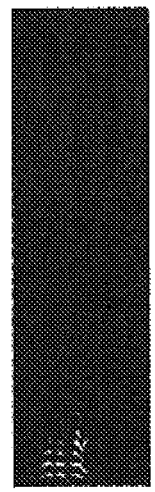

FIGS. 12A and 12B show a comparison of a registered speech spectrogram with an unknown speech spectrogram (to be collated), and a placement of a template on the registered speech spectrogram, according to the speech registration/collation processing in the speech collating apparatus of the third embodiment.

Figure 13A:
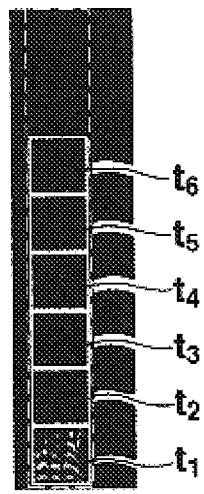
FIGS. 13A and 13B show a comparison of a distribution of positions at which template areas are placed on a registered speech spectrogram with a distribution of positions at which maximally correlated areas are detected on an unknown speech spectrum, according to the speech registration/collation processing in the speech collating apparatus of the third embodiment.
Figure 13B:
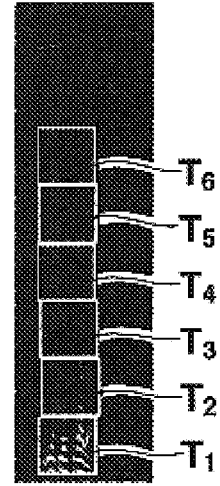

FIGS. 13A and 13B show a comparison of a distribution of positions at which template areas are placed on a registered speech spectrogram with a distribution of positions at which maximally correlated areas are detected on an unknown speech spectrum (to be collated), according to the speech registration/collation processing in the speech collating apparatus of the third embodiment.

For utilizing the speech collating apparatus as a person identifying apparatus, speech signal data of a registered person subjected to the identification is first input from the speech signal data input unit 21. This input registered speech signal data a(n) is converted to a sound spectrogram "A" in the sound spectrogram converting unit 22 (steps B1 and B2).

Then, the speech section detecting unit 29 detects a speech section from the sound spectrogram "A" of the registered speech converted by the sound spectrogram converting unit 22 (step B3).

Here, as illustrated in FIG. 11, the speech section detection processing performed in the speech section detecting unit 29 first sums up spectrum values in the direction of the frequency axis for the sound spectrogram "A" of the registered speech to calculate an additive spectrum distribution. Next, a section which includes all ranges having larger values than a previously set threshold value is detected within the additive spectrum distribution as a speech section. However, the set threshold value is defined to be one half of a maximum value in the additive spectrum distribution.

As the speech section is detected in the sound spectrogram "A" in this way, the template placing unit 25 defines a plurality of rectangular areas, i.e., templates $t_i$ (i=1 to m, where m is an integer equal to or larger than two) and places the templates $t_i$ on the speech section in the sound spectrogram "A", as shown in FIG. 12A (step B4).

Then, a partial area At including all the templates $t_i$ placed on the speech section in the sound spectrogram "A" of the registered speech is stored in the registered speaker information storage unit 23 for registration as a characteristic amount of the registered speaker (step B5).

On the other hand, as speech signal data of a speaker to be identified is input from the speech signal data input unit 21 for the identification in the person identifying apparatus, the input unknown speech signal data b(n) is converted to a sound spectrogram "B" in the sound spectrogram converting unit 22 as described above (steps B1 to B6).

Subsequently, the partial area At including the respective templates $t_i$ in the sound spectrogram "A" registered in the registered speaker information storage unit 23 as the characteristic amount of the registered speaker is read to the maximally correlated area detecting unit 26 in the collating unit 24. The maximally correlated area detecting unit 26 raster-scans image data of an area corresponding to each of the template $t_i$ on a pixel-by-pixel basis on the sound spectrogram "B" of the unknown speech to sequentially calculate a correlation coefficient using all pixel data in the associated template $t_i$ and pixel data in the sound spectrogram "B" of the unknown speech corresponding thereto (step B7). Then, an area $T_i$ in the sound spectrogram "B" of the unknown speech in which a maximum correlation coefficient is present is detected as shown in FIGS. 13A and 13B (step B8).

The calculation of the maximum correlation coefficient on the sound spectrogram "B" of the unknown speech based on the image data of each template $t_i$ defined on the speech section in the sound spectrogram "A" of the registered speech, and the detection of the area $T_i$ are sequentially performed for each template $t_i$ (steps S7 to S9). Then, upon determining that the respective areas $T_i$ on the sound spectrogram "B" of the unknown speech have been detected for all the templates $t_i$ as having the maximum correlation coefficients, the collation determining unit 27 in the collating unit 24 compares a distribution of the respective template areas $\{t_i\}$ placed on the speech section in the sound spectrogram "A" of the registered speech (positional relationship) with a distribution of the respective areas $\{T_i\}$ detected from the sound spectrogram "B" of the unknown speech (positional relationship) based on their respective coordinate data to evaluate the identity therebetween (steps B9 and B10).

In this way, the evaluation is made as to whether or not the unknown person who has input the unknown speech signal data b(n) has the identity to the registered speaker who had registered the registered speech signal data a(n), and the evaluation result is displayed or printed.

As appreciated, according to the speech collating apparatus of the third embodiment configured as described above, only two steps of processing, i.e., the processing for converting a sound spectrogram from speech signal data and the speech section detection processing for detecting a speech section from the sound spectrogram of a registered speech, are required as the preprocessing for calculating the characteristic amount applied to the collation processing for actually determining the identity between registered speech signal data and unknown speech signal data, thereby making it possible to reduce the number of processing steps. In addition, the sound spectrogram converted from the speech signal data is managed as multi-level gradation two-dimensional data, i.e., pixel data, and a contrast pattern of the sound spectrogram itself is used as the characteristic amount for use in the collation, and the templates are defined and placed on a speech section detected by the speech section detection processing to use a contrast pattern in the templates for the collation as a characteristic amount of the registered speech. Thus, the collation can be accomplished using a characteristic amount which more fully reflects personal information than the speech collating apparatus described in the first and second embodiments. It is therefore possible to realize a speaker identifying apparatus which further improves the hit rate over the first and second embodiments while reducing the number of processing steps to simplify the overall collation processing.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the techniques described in the respective embodiments, i.e., the speech registration/collation processing in the first embodiment illustrated in the flow chart of FIG. 3; the speech registration/collation processing in the second embodiment illustrated in the flow chart of FIG. 8; the speech registration/collation processing in the third embodiment illustrated in the flow chart of FIG. 10; and the like may be stored in an external recording medium 14 such as a memory card (ROM card, RAM card, or the like), a magnetic disk (floppy disk, hard disk, or the like), an optical disk (CD-ROM, DVD, or the like), a semiconductor memory, and the like for distribution as a program which can cause a computer to execute these techniques. In this case, a computer which functions as the speech collating apparatus can read the program stored on the external recording medium 14 into the storage device 13, and implement the speech registration and collation functions described in the respective embodiments, the operation of which is controlled by the read program, to execute similar processing to that provided by the aforementioned techniques.

Also, data required by the program for implementing the respective techniques may be transmitted over a network (public network) in the form of program codes, such that the program data is fetched by the transmission controller 15 of the speech collating apparatus connected to the network to implement the aforementioned speech registration and collation function.

According to the present invention, it is provided a speech collating apparatus and a speech collating method which are capable of identifying a speaker at a high hit rate without the need for a large number of preprocessing steps.

What is claimed is:

1. A speech data collating apparatus comprising:
    data converting means for converting two speech signals to two items of multi-level gradation data indicative of two-dimensional speech characteristics of said two speech signals;
    template setting means for setting rectangular templates on the two-dimensional speech characteristics of one of said two items of multi-level gradation data;
    correlated area detecting means for detecting rectangular areas on the two-dimensional speech characteristics of the other of said two items of multi-level gradation data that have a maximum correlation with regard to the rectangular templates; and
    collation determining means for comparing a mutual positional relationship of the templates with a mutual positional relationship of the rectangular areas which are detected by said correlated area detecting means to determine identity between the two speech signals.

2. The speech collating apparatus according to claim 1, further comprising registered speaker information storing means for storing multi-level gradation data corresponding to a speech signal of a registered speaker, and
    wherein said template setting means includes means for setting rectangular templates on the two-dimensional speech characteristics of the multi-gradation level data of the registered speaker read-out from said registered speaker information storing means; and
    wherein said correlated area detecting means includes means for detecting rectangular areas on the two-dimensional speech characteristics of the multi-gradation data of an unknown speaker that have a maximum correlation with regard to the rectangular templates.

3. The speech collating apparatus according to claim 2,
    wherein said registered speaker information storing means includes means for storing data on the rectangular templates set on the two-dimensional speech characteristics of the multi-level gradation data of the registered speaker; and
    wherein said correlated area detecting means includes means for detecting rectangular areas on the two-dimensional speech characteristics of the multi-level gradation data of the unknown speaker that have a maximum correlation with regard to the rectangular templates.

4. The speech collating apparatus according to claim 1, further comprising registered speaker information storing means for storing multi-level gradation data indicative of two-dimensional speech characteristics of a speech signal of a registered speaker,
    wherein said template setting means includes means for setting rectangular templates on the two-dimensional speech characteristics of the multi-level gradation data of an unknown speaker; and
    wherein said correlated area detecting means includes means for detecting rectangular areas on the two dimensional speech characteristics of the multi-level gradation data of the unknown speaker that have a maximum correlation with regard to the rectangular templates.

5. The speech collating apparatus according to claim 1, further comprising speech section detecting means for detecting a speech section in the multi-level gradation data, and
    wherein said template setting means includes means for setting templates on the speech characteristics of the multi-level gradation data in the speech section detected by said speech section detecting means.

6. The speech collating apparatus according to claim 1, wherein the multi-level gradation data comprises a sound spectrogram.

7. A speech data collating method comprising the following steps of:
    converting two speech signals to two items of multi-level gradation data indicative of two-dimensional speech characteristics of said two speech signals;
    setting rectangular templates on the two-dimensional speech characteristics of one of said two items of multi-level gradation data;

detecting rectangular areas on the two-dimensional speech characteristics of the other of said two items of multi-level gradation data that have a maximum correlation with regard to the rectangular templates; and comparing a mutual positional relationship of the templates with a mutual positional relationship of the rectangular areas detected by said correlated area detecting means to determine identity between the two speech signals.

8. The speech collating method according to claim 7, further comprising:

storing the multi-level gradation data corresponding to a speech signal of a registered speaker;

wherein said template setting step comprises setting rectangular templates on the two dimensional speech characteristics of the multi-level gradation data of the registered speaker; and wherein said correlated area detecting step comprises detecting rectangular areas on the two dimensional speech characteristics of the multi-level gradation data of an unknown speaker that have a maximum correlation with regard to the rectangular templates.

9. The speech collating method according to claim 8, wherein said registered speaker information storing step includes storing data on the rectangular templates set on the two-dimensional speech characteristics of the multi-level gradation data of the registered speaker; and wherein said correlated area detecting step includes detecting rectanaular areas on the two dimensional speech characteristics of the multi-level gradation data of the unknown speaker that have a maximum correlation with regard the rectangular templates.

10. The speech collating method according to claim 7, further comprising storing multi-level gradation data indicative of two-dimensional speech characteristics of a speech signal of a registered speaker, wherein said template setting step includes setting rectanaular templates on two-dimensional data of an unknown speaker; and wherein said correlated area detecting step includes detecting rectangular areas on the two dimensional speech characteristics of the multi-level gradation data of the unknown speaker that have a maximum correlation with regard to the rectangular templates.

11. The speech collating step according to claim 7, further comprising detecting a speech section in the multi-level gradation data, wherein said template setting step includes setting templates on speech characteristics of the multi-level gradation data in the speech section detected by said speech section detecting step.

12. The speech collating method according to claim 7, wherein the multi-level gradation data comprises a sound spectrogram.

13. A program recording medium having computer readable program codes, comprising:

first program code means for converting two speech signals to two items of multi-level gradation data indicative of two-dimensional speech characteristics of said two speech signals;

second program code means for setting rectangular templates on the two-dimensional speech characteristics of one of said two items of multi-level gradation data;

third program code means for detecting rectangular areas on the two-dimensional speech characteristics of the other of said two items of multi-level gradation data that have a maximum correlation with regard to the rectangular templates; and fourth program code means for comparing a mutual positional relationship of the templates with a mutual positional relationship of the rectangular areas which are detected by said third program code means to determine identity between the two speech signals.

14. The program recording medium according to claim 13, further comprising registered speaker information storing program code means for storing multi-level gradation data corresponding to a speech signal of a registered speaker, and wherein said second program code means includes program code means for setting rectangular templates on the two-dimensional speech characteristics of the multi-gradation level data of the registered speaker; and wherein said third program code means includes program code means for detecting rectanaular areas on the two-dimensional speech characteristics of the multi-gradation data of an unknown speaker that have a maximum correlation with regard to the rectangular templates.

15. The program recording medium according to claim 14, wherein said registered speaker information storing program code means includes program code means for storing data on the rectangular templates set on the two-dimensional speech characteristics of the multi-level gradation data of the registered speaker;

wherein said third program code means includes program code means for detecting rectangular areas on the two-dimensional speech characteristics of the multi-level gradation data of the unknown speaker that have a maximum correlation with regard to the rectangular templates.

16. The program recording medium according to claim 13, further comprising program code means for storing multi-level gradation data indicative of two-dimensional speech characteristics of a speech signal of a registered speaker, wherein said second program code means includes program code means for setting rectangular templates on the two-dimensional speech characteristics of the multi-level gradation data of an unknown speaker; and wherein said third program code means includes program code means for detecting rectangular areas on the two dimensional speech characteristics of the multi-level gradation data of the unknown speaker that have a maximum correlation with regard to the rectangular templates.

17. The program recording medium according to claim 13, further comprising speech section detecting program code means for detecting a speech section in the multi-level gradation data, wherein said second program code means includes program code means for setting templates on the speech characteristics of the multi-level gradation data in the speech section detected by said speech section detecting means.

18. The program recording medium according to claim 13, wherein the multi-level gradation data comprises a sound spectrogram.

* * * * *